United States Patent [19]

Finn et al.

[11] 4,218,033
[45] Aug. 19, 1980

[54] LOCKBAR RELEASE FOR INERTIA LOCKING SEAT BELT RETRACTOR

[75] Inventors: Bernard J. Finn, Troy; Charles B. Steger, Warren; Kenneth H. Reid, Mt. Clemens, all of Mich.

[73] Assignee: General Motors Corporation, Detroit, Mich.

[21] Appl. No.: 44,753

[22] Filed: Jun. 1, 1979

[51] Int. Cl.³ .................... A62B 35/02; B65H 75/48
[52] U.S. Cl. ............................................. 242/107.4 A
[58] Field of Search ............... 242/107.4 R, 107.4 E, 242/107.6; 297/388; 280/802–808

[56] References Cited

U.S. PATENT DOCUMENTS

| | | | |
|---|---|---|---|
| 2,708,555 | 5/1955 | Heinemann et al. | 242/107.4 A |
| 3,312,451 | 4/1967 | Davis | 242/107.4 R X |
| 3,503,571 | 3/1970 | Martin | 242/107.4 A |
| 3,771,814 | 11/1973 | Hahn | 242/107.4 R |

OTHER PUBLICATIONS

E. Nichol, *Seat Belt Systems for the Future,* Report on the Third International Technical Conference on Experimental Safety Vehicles, Wash., D.C., May 30–Jun. 2, 1972.

*Primary Examiner*—John M. Jillions
*Attorney, Agent, or Firm*—Charles E. Leahy

[57] ABSTRACT

A seat belt retractor for use in a passive seat belt system having one of the belt ends attached to the vehicle door. A belt reel is rotatably mounted on the retractor housing for belt winding and unwinding rotation. A toothed ratchet plate is carried by the reel. A lockbar is pivotally mounted on a support link which is in turn pivotally mounted on the retractor housing. A stop provided on the housing limits movement of the support link in the direction toward the toothed ratchet plate to establish the support link at a normal position wherein the pivot axis of the lockbar is situated over center with respect to the locking face of the lockbar and the pivot axis of the support link. Accordingly, whenever the inertia sensing pendulum moves the lockbar into locking engagement with the ratchet plate, the stop supports the support link and the lockbar against movement by the belt load so that the reel is locked against unwinding rotation. A manually operated handle is connected to the support link and permits the occupant to forcibly move the support link in the direction away from the stop and the ratchet plate so that the pivot axis of the lockbar is moved over center with respect to the support link pivot axis and the face of the lockbar engaging the ratchet plate. Thus, the lockbar is disengaged from locking engagement with the ratchet plate so that the belt may be unwound to terminate restraint of the occupant and permit opening movement of the door.

3 Claims, 8 Drawing Figures

LOCKBAR RELEASE FOR INERTIA LOCKING SEAT BELT RETRACTOR

The invention relates to a seat belt retractor of the type which an inertia sensing member engages a lockbar with a belt reel more particularly provides mechanism by which the lockbar may be manually disengaged from the reel.

BACKGROUND OF THE INVENTION

Vehicle occupant restraint belt retractors have heretofore been provided with an inertia responsive pendulum or the like for moving a lockbar into engagement with a toothed ratchet plate attached to the belt reel so that the occupant is restrained in the seat. The locking engagement between the lockbar and the ratchet plate teeth is effectively maintained for as long as an occupant restraining load is imposed on the belt even though the inertia stimulus is terminated. When the load is removed from the belt a slight belt rewinding rotation by a windup spring permits gravity to disengage the lockbar from the ratchet plate.

It is known to use the aforedescribed seat belt retractor in a seat belt system of the type having one end of the belt connected to the vehicle door so that the belt will be automatically moved to an unrestraining position when the door is opened and return to the restraining position when the door is closed. It has been recognized as desirable to provide a buckle in the belt so that the belt can be disconnected to permit opening of the door. In the alternative, it has been recognized as desirable to provide a handle or the like which is manually operable to forcibly disengage the lockbar from the ratchet plate so that the belt may be unwound from the reel to permit opening movement of the door.

SUMMARY OF THE INVENTION

The present invention provides a new and improved manually operated mechanism by which the lockbar may be disengaged from locking engagement with the reel even while the weight of the occupant is imposed on the restraint belt.

According to the invention a seat belt retractor has a belt reel rotatably mounted on the retractor housing for belt winding and unwinding rotation. A toothed ratchet plate is carried by the reel. A lockbar is pivotally mounted on a support link which is in turn pivotally mounted on the retractor housing. A stop provided on the housing limits movement of the support link in the direction toward the toothed ratchet plate to establish the support link at a normal position wherein the pivot axis of the lockbar is situated over center with respect to the lockbar locking face and the pivot axis of the support link. Accordingly, whenever the inertia sensing pendulum moves the lockbar into locking engagement with the ratchet plate, the stop will support the support link and the lockbar against movement by the belt load imposed thereon. A manually operated handle is connected to the support link and permits the occupant to forcibly move the support link in the direction away from the stop and the ratchet plate so that the pivot axis of the lockbar is moved over center with respect to the support link pivot axis and the face of the lockbar engaging the ratchet plate. Thus the lockbar is disengaged from locking engagement with the ratchet plate so that the belt may be unwound to terminate restraint of the occupant and permit opening movement of the door.

Accordingly, one feature, object and advantage of the invention resides in the provision of a collapsible support means which normally supports the lockbar in proximity with the ratchet plate to permit movement of the lockbar between the locking and unlocking positions and which is collapsible to withdraw the lockbar from engagement with the ratchet plate.

Another object, feature and advantage of the invention resides in the provision of pivotally mounted support link which pivotally mounts the lockbar in an over center position with respect to the pivot of the support link for withstanding loads imposed on the reel and an operator actuable handle for pivoting the support link to move the lockbar axis over center to a collapsed position disengaging the lockbar to permit free belt unwinding rotation of the reel.

A BRIEF DESCRIPTION OF THE DRAWINGS

These and other features, objects and advantages of the invention become apparent upon consideration of the specification and the appended drawings in which.

DESCRIPTION OF THE PREFERRED EMBODIMENT

Figure 1:
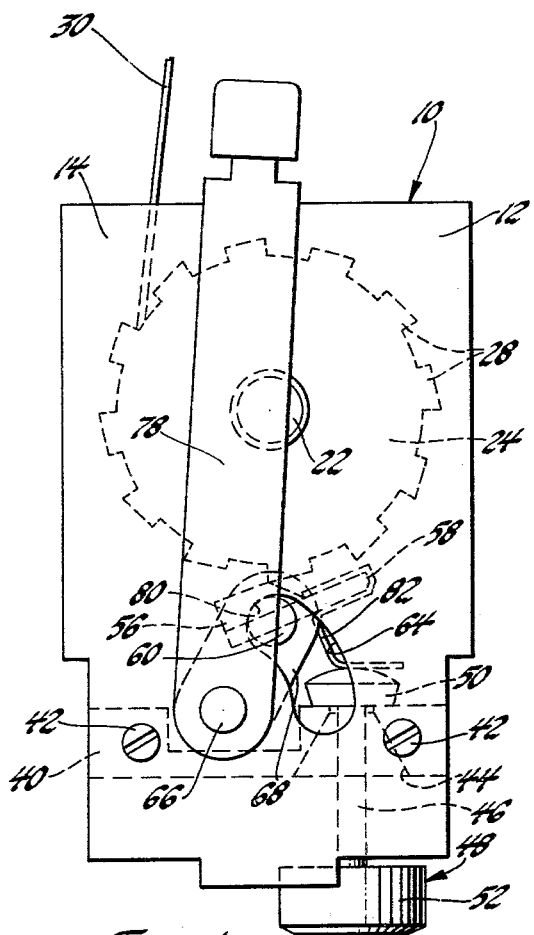
FIG. 1 is a side elevation view of the first embodiment of the invention showing the lockbar in the unlocked position.
Figure 4:
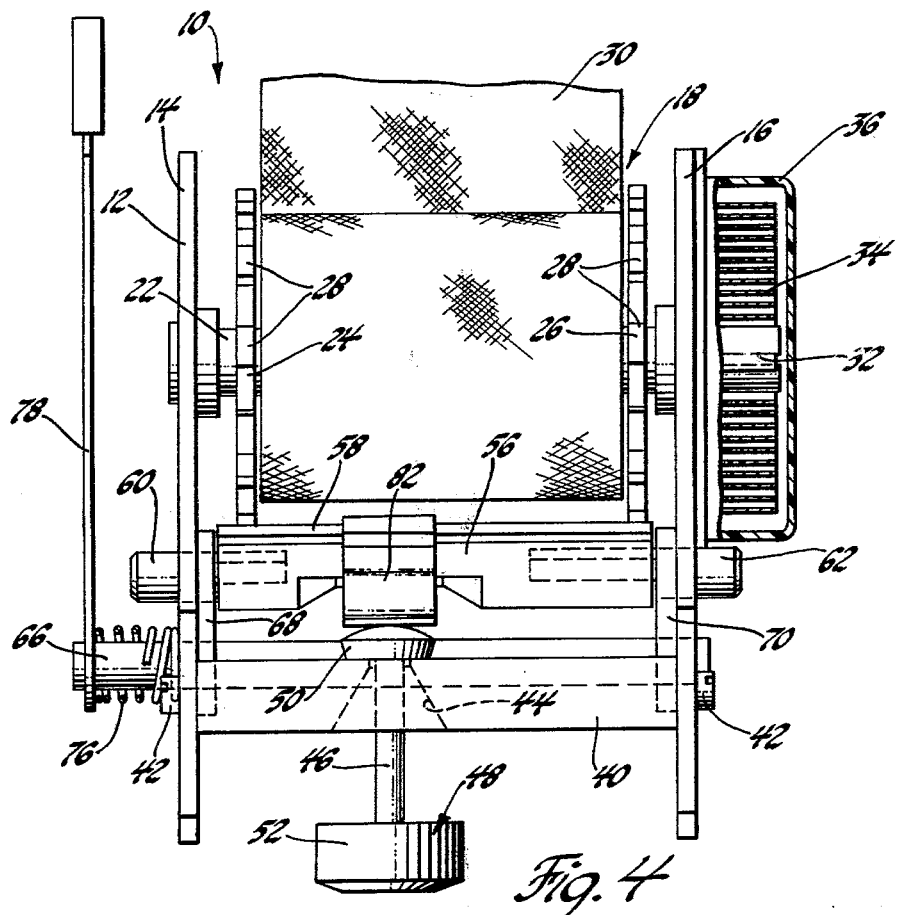
FIG. 4 is a front elevation view of the retractor of FIG. 1.
Figure 5:
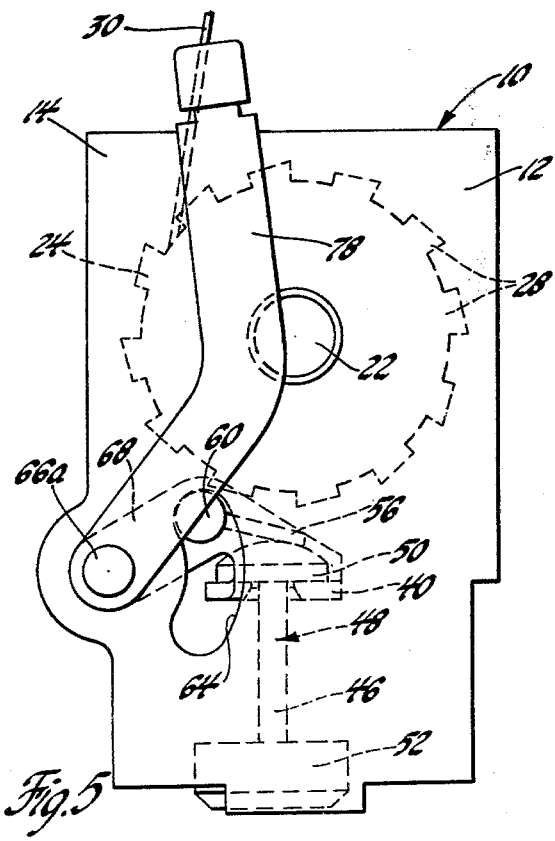
FIG. 5 is a side elevation view of the second embodiment of the invention showing the lockbar and the pendulum supported in proximity with the reel and the lockbar in the unlocked position.
Figure 6:
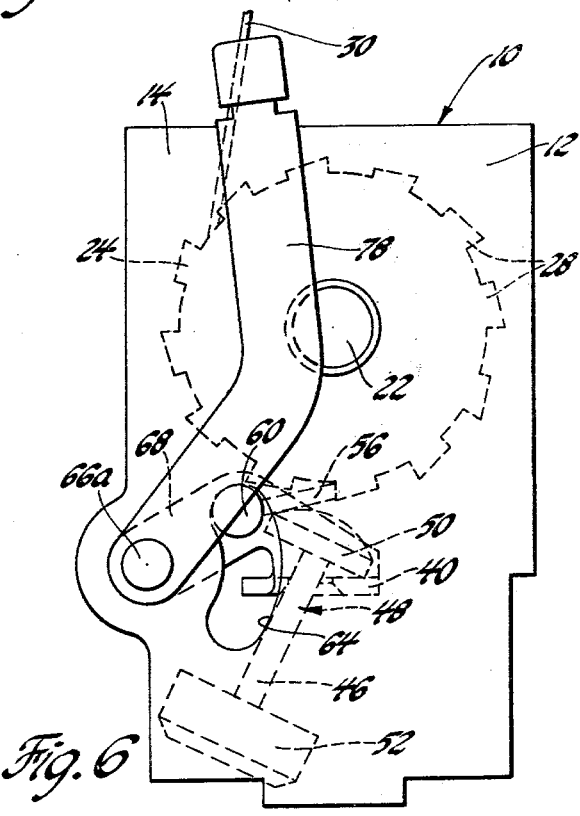
FIG. 6 is a view similar to FIG. 5 but showing the lockbar moved to the locking position.

Referring to FIGS. 1 and 4 of the drawings, a vehicle occupant restraint belt retractor is generally indicated by 10 and includes a stamped metal retractor housing generally designated 12. The housing 12 includes a pair of spaced apart parallel side walls 14 and 16. A belt reel generally designated 18 is rotatably mounted between the side walls 14 and 16 by a reel shaft 22. The belt reel 18 has spaced apart ratchet plates 24 and 26 having circumferentially spaced teeth 28. A restraint belt 30 is attached to the reel shaft 22 between the ratchet plates 24 and 26 and extends outwardly from the retractor for positioning across the seated occupant to provide a restraining function in the conventional manner.

The right hand end of the reel shaft 22 extends outwardly through the adjacent frame wall 16 and has a slot 32 which receives the inner end of a spiral spring 34. The outer end of the spiral spring 34, not shown, is suitably fixed to a spring cover 36 so that the reel 18 is normally biased in the belt winding direction to store the belt on the reel and pull the belt taut against the seated occupant.

A pendulum support 40, preferably of molded plastic, spans the distance between the frame walls 14 and 16 and is attached thereto by screws 42. The pendulum support 40 has an aperture 44 which receives the stem 46 of a pendulum assembly 48. A cap portion 50 of the pendulum 48 is supported on the upper surface of the pendulum support 40. A weight 52 is attached to the lower end of the stem 46. The pendulum 48 normally hangs in the vertical depending position of FIG. 4 but swings to the inclined position of FIG. 2 when a predetermined level of vehicle deceleration is experienced.

A lockbar 56 has a locking face 58 for engagement with the teeth 28 of ratchet plates 24 and 26. Pivot shafts 60 and 62 are attached to the ends of the lockbar 56 and extend through curvilinear slots 64 in the side walls 14 and 16. The curvilinear slots 64 are arcuate about a pivot shaft 66 which is pivotally journaled in aligned apertures of the side walls 14 and 16.

A pair of support links 68 and 70 are juxtaposed with the side walls 14 and 16 and are welded or otherwise suitably fastened to the pivot shaft 66 for rotation therewith. The support links 68 and 70 have aligned apertures which pivotally receive the lockbar pivot shafts 60 and 62 so that the lockbar 56 is pivotally moveable relative the support links 68 and 70.

Figure 2:
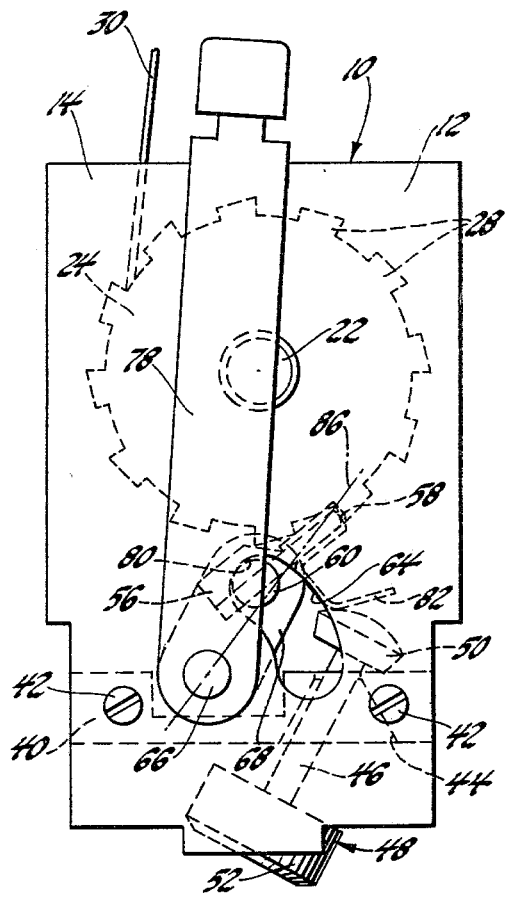
FIG. 2 is a view similar to FIG. 1 but showing the lockbar moved into engagement with the reel by the pendulum.

A torsion spring 76 encircles the pivot shaft 66 and acts between a handle 78 which is attached to the shaft 66 and the side wall 14 to bias the pivot shaft 66 to the rotary position of FIGS. 1 and 2 in which the lockbar pivot shafts 60 and 62 engage the upper ends 80 of the curvilinear slots 64.

A stamped metal clip 82 is attached to the lockbar 56 and rests upon the cap portion 50 of the pendulum 48 to establish the lockbar 56 at the normal rotary position of FIG. 1 in which the locking face 58 thereof is spaced from the ratchet teeth 28.

Referring to FIG. 2, it is seen that occurrence of a predetermined level of vehicle deceleration causes the pendulum 48 to assume the tilted position and pivots the lockbar 56 about its pivot shafts 60 and 62 to the position of FIG. 2 in which the locking face 58 engages the ratchet teeth 28. As seen in FIG. 2, the axes of the lockbar pivot shafts 60 and 62 are over center with respect to a line 86 drawn between the lockbar locking face 58 and the axis of the support link pivot shaft 66. Accordingly, the force imposed on the lockbar 56 during imposition of occupant restraining loads upon the belt will urge the lockbar pivot shafts 60 and 62 into engagement with the upper ends 80 of the curvilinear housing slots 64.

Upon termination of the vehicle deceleration condition, the pendulum 48 will return from the tilted position of FIG. 2 to the normal position of FIG. 1. Assuming that there is no occupant restraining load on the belt 30, the lockbar 56 will return to the position of FIG. 1. However, if the occupant's weight remains on the belt 30, the locking interengagement between the lockbar 56 and the ratchet teeth 28 as shown in FIG. 2 will retain the lockbar 56 in the locking position whether or not pendulum 48 may have returned to the normal vertical position of FIG. 1. Furthermore, the vehicle may come to rest at an unnatural attitude in which the force of gravity will tilt the pendulum 48 and cause the lockbar 56 to be engaged or remain in engagement with the ratchet teeth 28 even though there may be no occupant restraining load acting on the belt 30.

Figure 3:
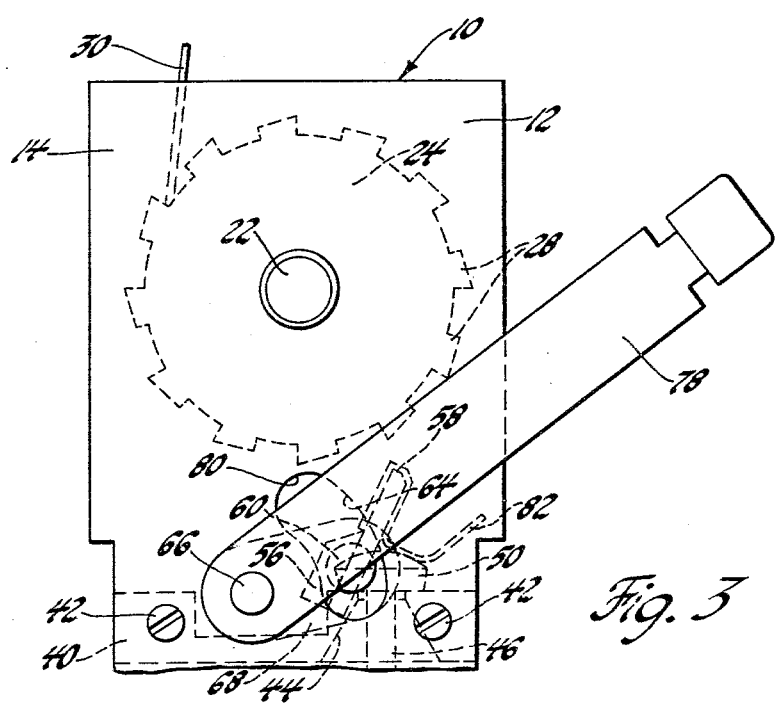
FIG. 3 is a view similar to FIGS. 1 and 2 but showing actuation of the handle to collapse the lockbar support and thereby disengage the lockbar from the reel.

Referring to FIG. 3, it is seen that the handle 78 may be rotated by the occupant in the clockwise direction in order to disengage the lockbar 56 from the ratchet teeth 28 so that the belt 30 can be unwound from the retractor 10. The initial clockwise rotation of the handle 78 from the position of FIG. 2 is effective to rotate the support links 68 and the lockbar pivot shafts 60 and 62 in a clockwise direction away from engagement with the upper end 80 of the curvilinear slots 64. As the lockbar pivot shafts 60 and 62 move over center with respect to the line 86, the belt load imposed on the lockbar moves over center and propels further clockwise movement of the handle 78 and support links 68 and 70 to the position of FIG. 3 in which the lockbar 56 becomes completely disengaged from the ratchet teeth 28.

It is noted that the aforedescribed movement from the position of FIG. 1 to the position of FIG. 2 is accompanied by imparting a slight counterclockwise belt winding motion to the reel but without the necessity of dragging the lockbar locking face 58 across the mating face of the tooth 28.

When the occupant releases the handle 78, the torsion spring 76 will return the handle 78, support links 68 and 70, and the lockbar 56 to the normal unlatched position of FIG. 1.

Referring to FIGS. 5-8, there is shown a second embodiment of the invention wherein those elements which are common to the embodiment of FIGS. 1-4 are indicated by like numerals.

Figure 7:
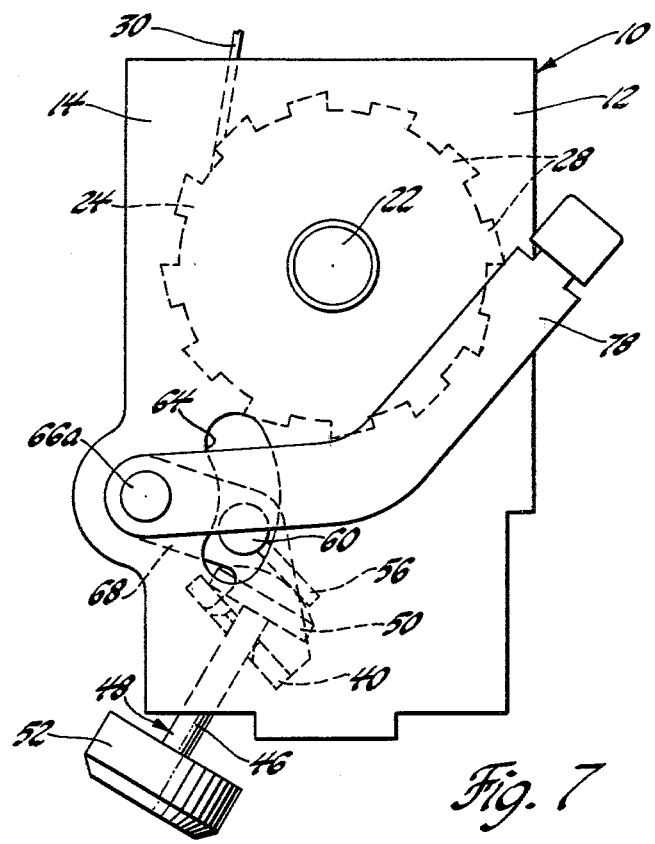
FIG. 7 is a view similar to FIGS. 5 and 6 but showing collapse of the support to carry the lockbar and the pendulum away from the reel.
Figure 8:
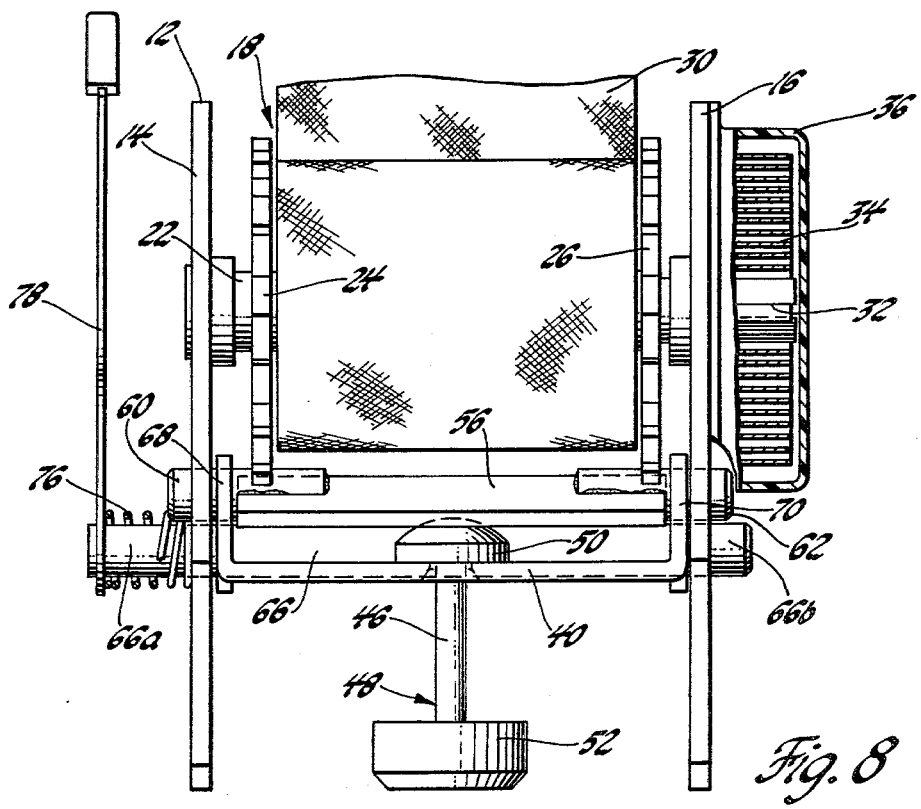
FIG. 8 is a front elevation view of the retractor of FIG. 5.

Referring to FIGS. 5-8, it will be understood that the pendulum support 40 is of stamped steel construction and is integral with the support links 68 and 70. The pivot shaft 66 is comprised of a portion 66a attached to support link 68 and a shaft portion 66b attached to support link 70. The operation of this second embodiment of the invention is the same as that described with respect to the first embodiment of the invention, except, as best seen in FIG. 7, the clockwise rotation of the handle 78 to effect over center collapse of the supports 68 and 70 and the lockbar 56 also rotates and bodily shifts pendulum 48 in the clockwise direction.

Thus, it is seen that the invention provides a new and improved manually operative mechanism by which the lockbar may be disengaged from locking engagement with the reel even while the weight of the occupant may remain imposed on the restraint belt.

While the invention has been disclosed primarily in terms of the specific embodiment shown on the drawings, it is not intended to be limited thereto but rather only to the extent set forth in the appended claims. For example, it is within the scope of the invention to associate the handle 78 with the handle provided in copending application Ser. No. 864,270, now U.S. Pat. No. 4,153,274, so that travel of the handle beyond the degree of rotation employed to manually set the winding prevention mechanism is effective to rotate the handle 78 or the pivot shaft 66.

The embodiments of the invention in which an exclusive property or privilege is claimed are defined as follows:

1. In a seat belt retractor having a belt reel journaled on a housing for belt winding and unwinding rotation, a ratchet plate carried by the reel, and a lockbar selectively movable between a locking position engaging the ratchet plate to lock the reel against belt unwinding rotation and an unlocking position disengaged from the ratchet plate to permit belt unwinding reel rotation, the improvement comprising:

support means mounting the lockbar for pivotal movement about a pivot axis between a locking position engaging the ratchet plate to lock the reel against belt unwinding rotation and an unlocking position disengaged from the ratchet plate to permit belt unwinding reel rotation;

means mounting the support means on the housing for movement from a normal position establishing the pivot axis of the lockbar in proximity with the ratchet plate for permitting selective movement of the lockbar between the locking position and unlocking position and a collapsed position withdrawing the pivot axis of the lockbar from proximity with the ratchet plate;

and operator actuatable means for moving the support means from the normal position to the collapsed position whereby the occupant may selectively disengage the lockbar from the ratchet plate to permit the belt unwinding rotation of the reel.

2. In a seat belt retractor having a belt reel journaled on a housing for belt winding and unwinding rotation, a ratchet plate carried by the reel, and a lockbar selectively movable between a locking position engaging the ratchet plate to lock the reel against belt unwinding rotation and an unlocking position disengaged from the ratchet plate to permit belt unwinding reel rotation, the improvement comprising:

a support link;

first pivot means mounting the lockbar on the support link for pivotal movement between the locking position and the unlocking position;

a second pivot means mounting the support link on the frame to permit pivotal movement of the support link toward the ratchet plate and away from the ratchet plate;

stop means on the housing limiting movement of the support link toward the ratchet plate to establish the support link at a normal position where the first pivot means mounting the lockbar is situated over center with respect to the second pivot means mounting the support link whenever the lockbar is in the locking position whereby the support link and lockbar are supported against movement by the load imposed upon the lockbar;

and an operator actuatable means for pivotally moving the support links away from the ratchet plate whereby the first pivot means mounting the lockbar is moved over center with respect to the second pivot means and the lockbar is disengaged from the locking position to permit belt unwinding rotation of the reel.

3. In a seat belt retractor having a belt reel journaled on a housing for belt winding and unwinding rotation, a ratchet plate carried by the reel, and a lockbar selectively movable by an inertia sensing member from an unlocking position disengaged from the ratchet plate to permit belt unwinding reel rotation and a locking position engaging the ratchet plate to lock the reel against belt unwinding rotation, the improvement comprising:

a support link having the inertia sensing member mounted thereon;

first pivot means mounting the lockbar on the support link for pivotal movement by the inertia sensing member between the unlocking position and the locking position;

second pivot means mounting the support link on the frame to permit pivotal movement of the support link toward the ratchet plate and away from the ratchet plate;

stop means on the housing limiting movement of the support link toward the ratchet plate to establish the support link at a normal position where the first pivot means mounting the lockbar is situated over center with respect to the second pivot means mounting the support link whenever the lockbar is moved to the locking position by the inertia sensing member whereby the support link and lockbar are supported against movement by the load imposed upon the lockbar;

and an operator actuatable means for pivotally moving the support links away from the ratchet plate whereby the first pivot means mounting the lockbar is moved over center with respect to the second pivot means whereby the lockbar is disengaged from the locking position to permit belt unwinding rotation of the reel.

* * * * *